United States Patent [19]
Andres et al.

[11] Patent Number: 5,280,997
[45] Date of Patent: Jan. 25, 1994

[54] MOTOR VEHICLE SEAT

[75] Inventors: Rudolf Andres, Sindelfingen; Holger Seel, Aidlingen; Volker Speck, Sindelfingen; Dietmar Zwölfer, Hildrizhausen, all of Fed. Rep. of Germany

[73] Assignee: Mercedes-Benz AG, Fed. Rep. of Germany

[21] Appl. No.: 846,176

[22] Filed: Mar. 5, 1992

[30] Foreign Application Priority Data

Mar. 5, 1991 [DE] Fed. Rep. of Germany ....... 4106863

[51] Int. Cl.⁵ ................................................ A47C 7/14
[52] U.S. Cl. .............................. 297/284.9; 297/284.6
[58] Field of Search .................. 297/284.6, 284.9, 459, 297/460

[56] References Cited

U.S. PATENT DOCUMENTS

| | | | |
|---|---|---|---|
| 4,592,588 | 6/1986 | Isono et al. | 297/284.6 |
| 5,082,326 | 1/1992 | Sekido et al. | 297/284.6 |

FOREIGN PATENT DOCUMENTS

| | | |
|---|---|---|
| 0229737 | 7/1987 | European Pat. Off. |
| 0235967 | 9/1987 | European Pat. Off. |
| 0328137 | 8/1989 | European Pat. Off. |
| 3522845 | 1/1986 | Fed. Rep. of Germany |
| 3505088 | 11/1986 | Fed. Rep. of Germany |
| 3537847 | 11/1986 | Fed. Rep. of Germany |
| 3537846 | 5/1987 | Fed. Rep. of Germany |
| 3620084 | 4/1988 | Fed. Rep. of Germany |
| 3707926 | 9/1988 | Fed. Rep. of Germany |
| 3839130 | 4/1990 | Fed. Rep. of Germany |
| 9014111 | 1/1991 | Fed. Rep. of Germany |
| 2508395 | 2/1982 | France |
| 2592844 | 7/1987 | France |
| 205238 | 12/1982 | Japan .................. 297/284.6 |
| 2210258 | 6/1989 | United Kingdom |

*Primary Examiner*—Peter R. Brown
*Attorney, Agent, or Firm*—Evenson, McKeown, Edwards & Lenahan

[57] ABSTRACT

A motor vehicle seat with a backrest contains a spring core and has forwardly curved side parts into which inflatable air cushions are inserted for varying the contour of the backrest. The air cushions are arranged between fixed uprights and the spring core. As a result, in the event of variations in the filling pressure in the air cushions the overall shape of the spring core is varied. The horizontal contour of the backrest can thus be varied to a greater degree than previously with air cushions in the upholstery, without the surface hardness of the upholstery being adversely affected.

22 Claims, 2 Drawing Sheets

MOTOR VEHICLE SEAT

BACKGROUND AND SUMMARY OF THE INVENTION

The present invention relates to a motor vehicle seat with a backrest, and, more particularly, to a motor vehicle seat with a backrest, containing a spring core and forwardly curved side regions into which there are inserted for the purpose of varying the contour of the backrest inflatable air cushions which, with increasing filling pressure, curve the upholstery of the side regions further forwards with respect to the central region of the backrest.

In a known motor vehicle seat of the type shown in German Patent 3,537,847, air cushions are installed in the upholstery of the side regions of the backrest. The contour of the backrest or the support function of its side regions can be varied only to a relatively limited degree. Moreover, with increasing filling pressure in the air cushions, the surface of the upholstery hardens, as a result of which the seating comfort can be adversely affected.

Furthermore, motor vehicle seats of the type shown in German Patent 3,620,084 provide that the contour of the backrest can be varied. It is possible by mechanical stressing of a metallic support element to vary the support of the upholstery such that the latter is held either in a flat horizontal contour with only slightly precurved side regions, or can adopt under seat loading a contour with more strongly precurved side regions and a rearwardly curved central region. This known seat takes account of the fact that thinner persons require a stronger curve in the central region of the backrest than do wider persons. However, it also required a special configuration of the backrest and, because of the adjusting mechanism, is complicated, trouble-prone and not suitable for an adjustment by compressed air that takes account of safety requirements.

In order to vary the contour of the central region of a backrest, German Offenlegungsschrift 3,522,845 shows an air cushion subdivided into a plurality of chambers between a spring element of flat construction and the upholstery. This measure alone, however, makes it possible to vary essentially only the vertical contour of the backrest, whereas the backrest horizontal contour, in particular of the side regions, remain largely uninfluenced.

In a motor vehicle seat shown in German Patent 3,505,088, a combination of three air cushions serve the purpose of back support in the central region and one air cushion each in the side regions of the back rest serve the purpose of lateral support. A control for the compressed air is provided with a slide via which, among other things, the air cushions for back support can be selected individually or in pairs. In this configuration, as well however, the air cushions are incorporated into the upholstery, as a result of which the contour of the backrest can be varied only to a limited degree.

It is, therefore, an object of the present invention to provide a motor vehicle seat in which the contour of the backrest can be adapted as far as possible to the requirements of the various seat users without the surface hardness of the upholstery being adversely affected.

This object has been achieved according to the present invention in a motor vehicle seat in which a spring core extends with end sections bent slightly forward into the side regions of the backrest, and the air cushions are supported on fixed uprights of the seat and act on the end sections of the spring core on their side facing the uprights. The overall shape of the one-piece spring core is varied by way of these features. Consequently, only the contour of the upholstery is influenced, while the surface hardness thereof is not. The side regions of the backrest are adjusted overall forwards and inwards, so that even relatively thin persons can be effectively supported towards the sides.

The support function of the backrest is further increased, particularly for relatively thin persons, when, according to the present invention, the spring core is constructed such that, with increasing filling pressure in the air cushions, the central region of the spring core curves rearwards or more strongly rearwards.

A currently contemplated embodiment that is deemed optimal with respect to seating comfort and support for as wide as possible a range of seat users combines the foregoing features of with at least one air cushion with settable filling pressure in the central region. This air cushion is preferably inserted between the spring core and a rubberized-hair mat of the upholstery so that even in the central region of the backrest, no surface hardening of the upholstery occurs when the filling pressure in the air cushion or cushions is set to higher values.

The contour of the backrest can be varied even more individually when, according to the present invention, at least two air cushions arranged in the side regions and/or in the central region of the backrest and preferably can be controlled individually. In this arrangement, the air cushions in the side regions of the backrest can be controlled independently of the air cushions in the backrest central region.

In another preferred embodiment of the present invention, four air cushions are arranged above one another in the vertical direction in the central region of the backrest and are controlled such that two adjacent air cushions have the same filling pressure. As a result, in the event of a variation in contour in the central region it is necessary in each case to fill only one air cushion, while another is vented. Due to this type of control and arrangement of four relatively small air cushions, the desired contour can be achieved more rapidly than in the case of an arrangement with three larger air cushions.

The setting of the contour is facilitated when, according to the present invention, a control for that purpose is provided with three pushbuttons for controlling the four air cushions in the central region, a rocker switch for controlling the air cushions in the side regions and a setting element for preferably stepless setting of the filling pressure in the air cushions.

The control can preferably be provided in the seat cushion cover on the entrance side and be retained therein by a locking connection. The setting element, configured as, for example, a setting wheel for the filling pressure can expediently act on a pressure regulator connected to the control.

A space-saving design is produced when, according to another advantageous aspect of the present invention, the air cushions are arranged to overlap one another at least in the unpressurized state.

In yet another embodiment of the present invention, the air cushion or cushions, in particular the air cushions inserted in the central region of the backrest, is/are attached to a flexible carrier mat that is, or can be, removably connected to the spring core. The carrier mat can preferably consist of a textile material, in particular felt material. Such a carrier mat can effectively follow the deformations of the spring core and simultaneously support the air cushion two-dimensionally. The characteristic or the characteristic spring curve of the spring core is maintained virtually unaltered in all directions because the pressure exerted by the air cushions is not transmitted onto the spring, core two-dimensionally, but only locally. Furthermore, owing to the insertion behind the complete covering it is ensured that, upon inflation of the air cushions, the surface of the covering is not hardened or is hardened only to an extent that is not troublesome.

A durable and pressure-proof configuration of the air cushions results when the latter are formed, from welded polyurethane films.

In order to avoid noises at the contact surfaces of adjacent air cushions, intermediate layers made of nonwoven material between the air cushions are provided. These intermediate layers can be formed by the walls of pouches or envelopes which preferably open laterally, surround the air cushions and are removably attached, preferably by the latter, to the carrier mat.

BRIEF DESCRIPTION OF THE DRAWINGS

These and other objects, features and advantages of the present invention will become more apparent from the following detailed description of a currently preferred embodiment thereof when taken in conjunction with the accompanying drawings wherein.

DETAILED DESCRIPTION OF THE DRAWINGS

Figure 1:
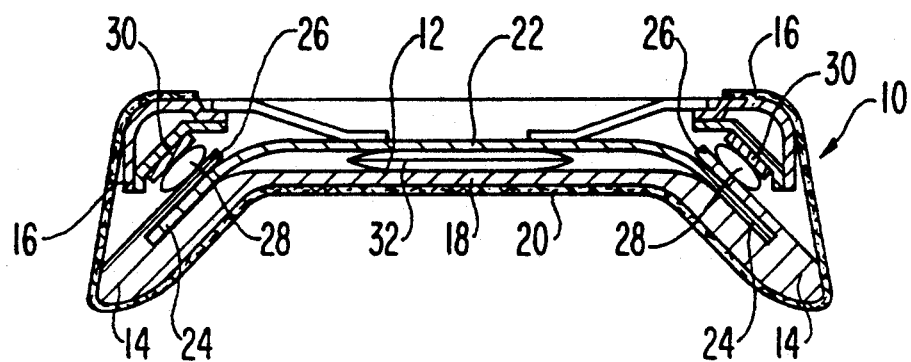
FIG. 1 is a horizontal cross-sectional view through the motor vehicle backrest with pressure-relieved air cushions in the side regions in accordance with the present invention.

Referring now to FIG. 1, the backrest 10 has a central region 12 serving as lumbar support, and two cheek-like side regions 14 which support the seat user laterally. Two uprights 16 are provided in the side regions 14 as bearing members of the backrest 10. The central region 12 and the side regions 14 have an upholstery 18 whose covering 20 is laid around the uprights 16, and which has a rubberized-hair mat on the inside.

A flat spring core 22 extends with bent end sections 24 into the side regions 14 and serves to resiliently support the upholstery 18. The end sections 24 of the spring core 22 are covered by projecting flaps 26 of the rubberized-hair mat on the side facing the uprights 16. The end sections 24 are each supported by an inflatable air cushion 28 on the uprights 16 via plastic members 30 attached thereto.

Figure 2:
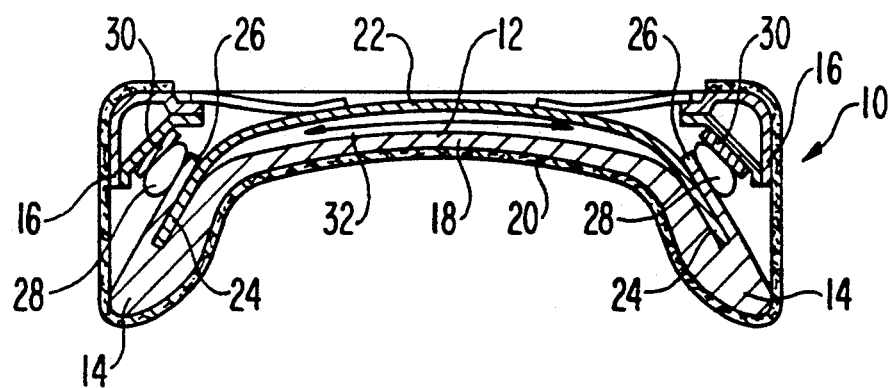
FIG. 2 is a view similar to FIG. 1, but with inflated air cushions in the side regions.

Due to the above-described configuration and support of the spring core 22, the spring core 22 is deformed as a whole upon inflation of the air cushions 28, and consequently the backrest 10 is converted from the initial contour shown in FIG. 1 to the contour shown in FIG. 2. In this inflation process, the side regions 14 are swivelled forwardly and inwardly, and the central region 12 is curved rearwardly. The upholstery 18 itself remains largely uninfluenced by this process, so that a rising filling pressure in the air cushions 28 leads to virtually no surface hardening of the upholstery 18. Owing to the stronger curvature of the central region 12 and to the closer mutual distance of the side regions 14, however, the backrest contour represented in FIG. 2 is particularly favorable for narrower passengers.

Optionally, an air cushion insert unit designated generally by numeral 32 can be arranged in the central region 12 of the backrest 10 between the spring core 22 and the upholstery, via which the vertical contour of the backrest 10 can be varied without disadvantageously influencing the surface hardness of the upholstery 18.

Figure 3:
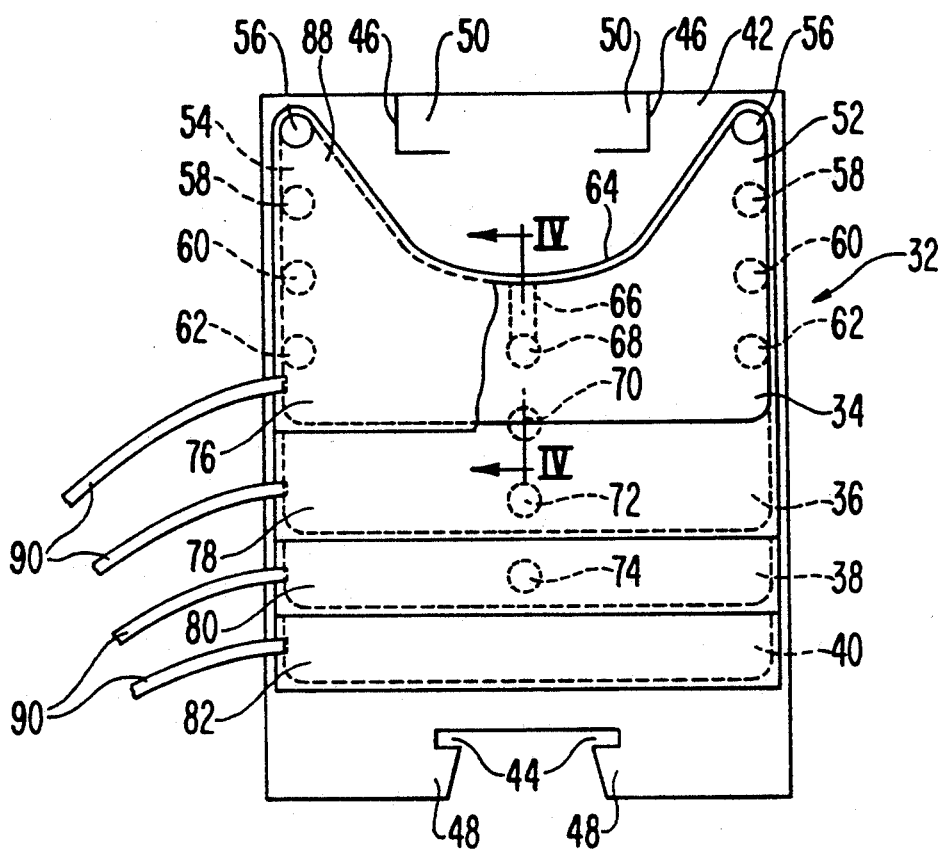
FIG. 3 is a front view of an air cushion insert unit for the central part of the backrest shown in FIGS. 1 and 2.

As shown in more detail in FIG. 3, the air cushion insert unit 32 has four partially overlapping air cushions 34,36,38,40, arranged above one another in the vertical direction and removably secured to a flexible carrier mat 42. The carrier mat 42 consists of a textile material, in particular of felt material, and in the inserted state lies flat on the spring core 22. The material and the dimensions of the carrier mat 42 are selected such that the mat 42 can follow the deformations of the spring core 22 and, at the same time, support the air cushions 34 to 40 two-dimensionally. The carrier mat 42 is provided on the lower rim with cutouts 44, and on the upper rim with slits 46, to provide respective flaps 48,50 which can be bent out and pushed behind suitable retaining elements of the spring core 22 for the purpose of removably connecting the carrier mat 42 to the spring core 22.

The air cushions 34 to 40 are each formed from two polyurethane films welded to one another on the rims, and therefore are particularly pressure-proof and durable. The two upper corner regions 52,54 of each air cushion 34 to 40 are extended upwardly and removably secured there by press buttons to the carrier mat 42. For this purpose, the air cushions 34,36,38,40 are assigned the respective press-button pairs 56,58,60,62 in this sequence. Moreover, each air cushion 34 to 40 has on the unraised central rim area 64, a bracket 66 which is turned over rearwardly and downwardly and by way of which the air cushions are additionally held o the carrier mat 42 by further respective press buttons 68,70,72,74.

Figure 4:
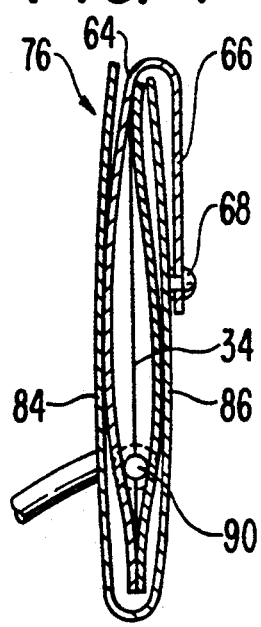
FIG. 4 is a sectional view along line IV-IV of FIG. 3.

Each air cushion is surrounded by a pouch 76 and/or 78 and/or 80 and/or 82 so that the air cushions 34 to 40 do not touch one another and thereby cause noises, each pouch being open towards the sides and whose two pouch walls 84,86, shown more clearly in FIG. 4, form a contact guard engaging between the air cushions. For the sake of simplicity, the section along line IV—IV in FIG. 3 is led only through the uppermost air cushion 34 and the pouch 76 assigned thereto. The pouches 76 to 82 comprise a nonwoven material and, in the view according to FIG. 3, have approximately the same outline profile as the assigned air cushions 34 to 40. Accordingly, the pouches 76 to 82 are also provided with raised corner regions 88 (with the right-hand half of the upper pouch 76 being broken away in FIG. 3 for illustrative purposes only).

Figure 5:
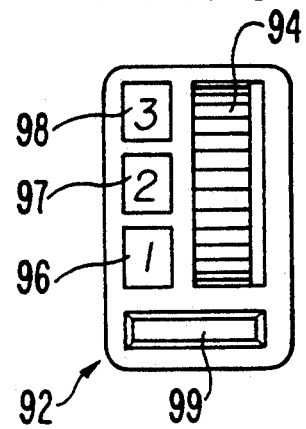
FIG. 5 is a plan view of the control of the compressed air supply device for the backrest shown in FIGS. 1 to 4.

The pouches 76 to 82 are removably buttoned to the carrier mat 42 with the air cushions 34 to 40 which they surround by the press button pairs 56 to 62. Furthermore, each air cushion 34 to 40 can be or is connected via a respective line 90 to a compressed air supply device whose control 92 is shown in top view in FIG. 5.

The compressed air supply control device designated generally the numeral 92 is constructed for insertion in the seat cover on the entrance side and has a pressure regulator for the air pressure in the air cushions 34 to 40 so that the governing pressure can be set steplessly via a setting wheel 94 on the control device 92. Furthermore, the device 92 is provided with opening and closing valves in the supply lines to the air cushions 34 to 40, which are influenced via three pushbuttons 96,97,98 and a conventional type of control logic. The arrangement is such that when one of the pushbuttons 96,97,98 is pushed, two adjacent air cushions 34,36 and/or 36,38 and/or 38,40, acquire the filling pressure prescribed via the setting wheel 94, and the two other air cushions are relieved of pressure. As a result, upon setting or varying the vertical contour of the backrest 10 it is only necessary in each instance to fill one air cushion, while another air cushion is relieved. The vertical contour of the backrest 10 can therefore be brought rapidly into the desired shape.

The compressed air supply device is further provided with a control valve (not shown) which is arranged in parallel with the pressure regulator and controls the filling pressure in the lateral air cushions 28. This control valve of known construction is influenced by a centrally stable rocker switch 99 on the control device 92, via which the filling pressure in the air cushions 28 is set depending on the direction and duration of actuation of the rocker switch.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A motor vehicle seat with a backrest and upholstery comprising a spring core having forwardly curved side regions, inflatable air cushions located behind the forwardly curved side regions for varying the contour of the backrest by curving the upholstery at the side regions further forwards in a longitudinal motor vehicle direction with respect to a central region of the backrest, means for varying an amount of said curving according to filling pressure of the air cushions, wherein the spring core extends with end sections slightly bent forwardly into the side regions of the backrest, and the inflatable air cushions are supported on fixed uprights of the motor vehicle seat and act on the end sections of the spring core on a side thereof facing the fixed uprights.

2. The motor vehicle seat according to claim 1, wherein the spring core is configured such that, with increasing filling pressure in the air cushions, a central region of the spring core curves rearwardly.

3. The motor vehicle seat according to claim 1, wherein at least one air cushion with settable filling pressure is inserted in the central region of the backrest between the spring core and a rear-side rubberized-hair mat of the upholstery.

4. The motor vehicle seat according to claim 3, wherein the spring core is configured such that, with increasing filling pressure in the air cushions, a central region of the spring core curves rearwardly.

5. The motor vehicle seat according to claim 3, wherein the air cushions in the side regions of the backrest are arranged to be controlled independently of the air cushions in the central region of the backrest.

6. The motor vehicle seat according to claim 3, wherein the at least one air cushion constitutes four air cushions arranged above one another in a vertical direction in the central region of the backrest and controlled such that two adjacent pair of the four air cushions have the same filling pressure.

7. The motor vehicle seat according to claim 6, wherein a control apparatus for setting the contour of the backrest comprises three pushbuttons for controlling the four air cushions in the central region of the backrest, a rocker switch for controlling the air cushions in the side regions, and a setting element for setting the filling pressure in the four air cushions, with the filling pressure being settable steplessly.

8. The motor vehicle seat according to claim 6, wherein a control apparatus for setting the contour of the backrest comprises three pushbuttons for controlling the four air cushions in the central region of the backrest, a rocker switch for controlling the air cushions in the side regions, and a setting element for setting the filling pressure in the four air cushions, with the filling pressure being settable one of steplessly and with small stepped jumps.

9. The motor vehicle seat according to claim 3, wherein the at least one cushion, inserted in the central region of the backrest is attached to a flexible carrier mat adapted to be removably connected to the spring core so as to rest thereon, and the carrier mat comprises a felt textile material.

10. The motor vehicle seat according to claim 9, wherein nonwoven intermediate layers are arranged between adjacent air cushions.

11. The motor vehicle seat according to claim 9, wherein the air cushions are formed from welded polyurethane film.

12. The motor vehicle seat according to claim 10, wherein the intermediate layers comprise pouches, having walls open laterally and surrounding the air cushions so as to be removably retained on the carrier mat.

13. The motor vehicle seat according to claim 12, wherein the air cushions are formed from welded polyurethane film.

14. The motor vehicle seat according to claim 3, wherein the air cushions are formed from welded polyurethane film.

15. The motor vehicle seat according to claim 1, wherein at least two air cushions which can preferably be controlled individually are arranged in at least one of the side regions and the central region of the backrest.

16. The motor vehicle seat according to claim 15, wherein at least one air cushion with settable filling pressure is inserted in the central region of the backrest between the spring core and a rear-side rubberized-hair mat of the upholstery.

17. The motor vehicle seat according to claim 15, wherein at least one air cushion with settable filling pressure is inserted in the central region of the backrest between the spring core and a rear-side rubberized-hair mat of the upholstery.

18. The motor vehicle seat according to claim 15, wherein the air cushions are overlappingly arranged with respect to one another at least in an unpressurized state.

19. The motor vehicle seat according to claim 1, wherein at least two air cushions which can preferably be controlled in groups are arranged in at least one of the side regions and the central region of the backrest.

20. The motor vehicle seat according to claim 19, wherein at least one air cushion with settable filling pressure is inserted in the central region of the backrest between the spring core and a rear-side rubberized-hair mat of the upholstery.

21. The motor vehicle seat according to claim 19, wherein at least one air cushion with settable filling pressure is inserted in the central region of the backrest between the spring core and a rear-side rubberized-hair mat of the upholstery.

22. The motor vehicle seat according to claim 19, wherein the air cushions are overlappingly arranged with respect to one another at least in an unpressurized state.

* * * * *